(12) United States Patent
Schmidt et al.

(10) Patent No.: US 8,646,391 B2
(45) Date of Patent: Feb. 11, 2014

(54) RAIL VEHICLE FOR A DRIVING OPERATION ON TRACK SYSTEMS HAVING A BALLASTED SUPERSTRUCTURE

(75) Inventors: Wolfgang Schmidt, Schwalbach / Ts. (DE); Dieter Fastnacht, Bad Oeynhausen (DE); Alfred Krumpf, Murnau (DE); Juergen Kupies, Duisburg (DE); Kasper Schroeder-Bodenstein, Duesseldorf (DE); Maik Scholz, Sangerhausen / Grillenberg (DE)

(73) Assignees: DB Fernverkehr AG, Framkfurt am Main (DE); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/519,056

(22) PCT Filed: Jan. 19, 2011

(86) PCT No.: PCT/EP2011/000207
§ 371 (c)(1),
(2), (4) Date: Jun. 25, 2012

(87) PCT Pub. No.: WO2011/088996
PCT Pub. Date: Jul. 28, 2011

(65) Prior Publication Data
US 2012/0272858 A1    Nov. 1, 2012

(30) Foreign Application Priority Data
Jan. 20, 2010 (DE) .......................... 10 2010 005 250

(51) Int. Cl.
*B60D 5/00* (2006.01)

(52) U.S. Cl.
USPC ................. 105/8.1; 105/12; 105/15; 105/413

(58) Field of Classification Search
USPC ........................ 105/8.1, 12, 15, 413
See application file for complete search history.

(56) References Cited

U.S. PATENT DOCUMENTS

| | | | | |
|---|---|---|---|---|
| 2,568,684 A * | 9/1951 | Mihalyi | .......................... | 105/18 |
| 4,252,065 A * | 2/1981 | Bickel et al. | .................... | 105/10 |
| 4,798,148 A * | 1/1989 | Girard | .............................. | 105/17 |
| 4,819,565 A * | 4/1989 | Bechu | .............................. | 105/11 |
| 4,984,522 A * | 1/1991 | Parish | ............................. | 105/15 |
| 5,111,752 A * | 5/1992 | Carimentrand | ................. | 105/18 |

(Continued)

FOREIGN PATENT DOCUMENTS

| | | |
|---|---|---|
| DE | 726 181 | 10/1942 |
| DE | 10 2004 041 090 | 3/2006 |

(Continued)

OTHER PUBLICATIONS

International Search Report of PCT/EP2011/000207, date of mailing Apr. 26, 2011.

*Primary Examiner* — Jason C Smith
(74) *Attorney, Agent, or Firm* — Collard & Roe, P.C.

(57) ABSTRACT

The invention relates to a rail vehicle for driving operation on track systems with ballast permanent way. The invention is to effectively avoid or at least significantly reduce an agglomeration of snow and ice in cavities of the vehicle underfloor. For this purpose it is provided that the rail vehicle in the region of its underfloor comprises at least one flexible membrane which spans hollow spaces which are positioned open towards the track systems or support frame structures of the underfloor of the rail vehicle.

8 Claims, 3 Drawing Sheets

(56) References Cited

U.S. PATENT DOCUMENTS

Figure 1:
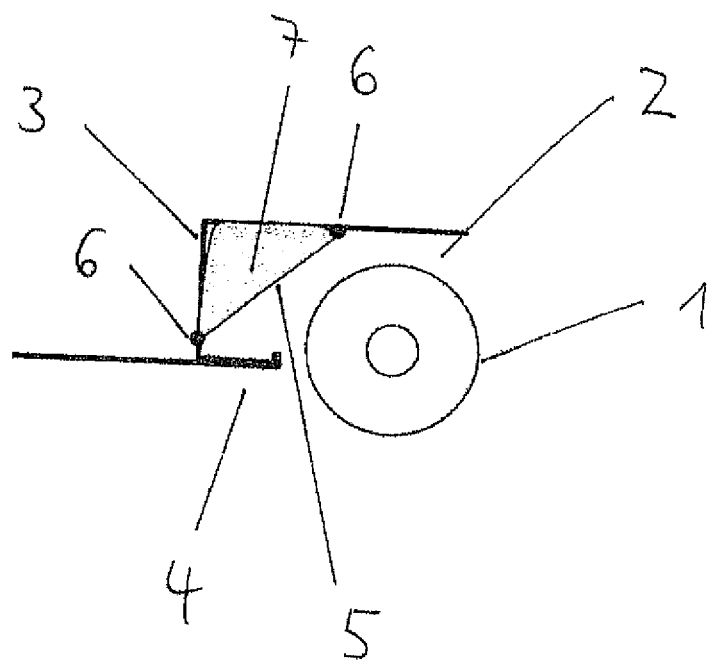

| | | | |
|---|---|---|---|
| 5,562,042 A * | 10/1996 | Luck et al. | 105/8.1 |
| 5,953,998 A * | 9/1999 | Petit | 105/18 |
| 6,085,403 A * | 7/2000 | Petit | 29/454 |
| 7,506,590 B2 * | 3/2009 | Moser et al. | 105/8.1 |
| 7,669,615 B2 * | 3/2010 | Koch | 138/121 |
| 2009/0193999 A1* | 8/2009 | Gomis | 105/18 |
| 2012/0204754 A1* | 8/2012 | Goebels et al. | 105/15 |
| 2012/0272858 A1* | 11/2012 | Schmidt et al. | 105/413 |

FOREIGN PATENT DOCUMENTS

| | | |
|---|---|---|
| EP | 0 050 200 | 4/1982 |
| EP | 0 932 540 | 8/1999 |
| EP | 1 640 499 | 3/2006 |
| EP | 1 852 326 A2 | 11/2007 |
| WO | WO 2007/065682 | 6/2007 |

* cited by examiner

RAIL VEHICLE FOR A DRIVING OPERATION ON TRACK SYSTEMS HAVING A BALLASTED SUPERSTRUCTURE

CROSS REFERENCE TO RELATED APPLICATIONS

This application is the National Stage of PCT/EP2011/000207 filed on Jan. 19, 2011, which claims priority under 35 U.S.C. §119 of German Application No. 10 2010 005 250.7 filed on Jan. 20, 2010, the disclosure of which is incorporated by reference. The international application under PCT article 21(2) was not published in English.

The invention relates to a rail vehicle for driving operation on track systems with ballast permanent way.

During the driving operation of such vehicles there is frequently the problem that individual ballast stones are torn out of the ballast bed and flung up through a wide range of effects while being driven over by rail vehicles, wherein such ballast stones can strike the underfloor region of the rail vehicle driving overhead with full force, where they can cause damages. Likewise, damages can be caused on installations of the track infrastructure (e.g. track switching means). Through such ballast stones, which again impact on the track bed where they cause further additional ballast stones to be thrown up, this process can build up into a massive ballast avalanche that is self-sustaining over an extended period of time. This phenomenon is specifically known among experts as ballast flight, ballast throw or ballast impact. The problems of ballast flight mainly occur when rail systems with conventional ballast permanent way are driven over at travelling speeds in excess of 200 km/h.

EP 050 200 B1 discloses to the person skilled in the art a complete housing of all damage-susceptible underfloor regions of a rail vehicle, wherein the units located there are accessible for service or maintenance purposes via laterally arranged flaps. This technical teaching however is restricted to minimising the vehicle-related consequences of the ballast flight. However, the problem that in practice, on the one hand, not all vehicle underfloor regions can be housed and, on the other hand, this technical teaching does not show any solution approach for the infrastructure-related damages from the ballast flight, continues to exist.

DE 10 2004 041 090 A1 proposes a screening of the rail vehicle in the underfloor region by means of deflector elements to solve this problem, which through their shape and arrangement deflect against the travelling direction of the rail vehicle. These deflector elements are designed as flat or convexly curved plates, which run parallel or obliquely to the upper edge of the rails. In order to avoid a violation of the ground clearance of the rail vehicle, the deflector element can be pivotably mounted. The use of such deflector elements however is only practical if this can be incorporated as integral part in the design of the underfloor region of a rail vehicle even during the course of the concept or design phase. During a subsequent conversion of conventional rail vehicles, hollow spaces are created through the deflector elements in which snow deposits can accumulate. These accumulations can ice-up, be loosened through dynamic actions while travelling and fall into the ballast bed with major force, as a result of which in turn the actually undesirable ballast flight is brought about. The causality between ice formation on the vehicle or ice dumping and ballast flight caused by this was derived in practice from the ballast flight-related damage patterns which are more frequent and intensive during the winter months.

Moreover, DE 10 2004 041 090 A1 does not offer any solution approach for the infrastructure-related damages from the ballast flight.

A similar solution approach is pursued by the technical teaching of WO 2007/065682 A1. This discloses a screening against stone impact, which is embodied elastically deformable under impulse action from the outside (e.g. through an impacting ballast stone). In this manner, the maximally active forces which are generated when a ballast stone strikes the protection object, are reduced compared with a rigid arrangement know from DE 10 2004 041 090 A1. However, WO 2007/065682 A1 does not offer any solution approach for the infrastructure-related damages from the ballast flight.

To avoid icing-up of components in the underfloor region of rail vehicles EP 932 540 B1 proposes to provide these with a special surface coating, which consists of an outer, impact-resistant layer sloping towards the component outside and an inner layer with high heat-insulating capability and high elasticity. Through the inner insulating layer, a heat transfer to the outer layer is to take place during the transition phase from water or snow into ice, and prevent a freezing of water or snow on the component surface there. Furthermore, the inner layer is to have a lower stiffness than the outer layer and in this way make possible local deformations of the component surface, which in possible ice accumulations on the component surface induce stresses, causing these to break off the surface. In practice, this solution approach is problematic especially in the case of the conversion of existing vehicles, since all individual components in the underfloor region of a rail vehicle have to be re-designed. In the case of complex geometrical component configurations and unfavourable weather conditions, the devices proposed in EP 932 540 B1 cannot effectively prevent any ice formation because of their comparatively small dimensioning.

The invention is therefore based on the object of designing a rail vehicle for driving operation on track systems with ballast permanent way in such a manner that an agglomeration of snow and ice in cavities of the vehicle underfloor is effectively avoided or at least significantly reduced. In particular, a solution is to be provided which makes possible a simple and cost-effective retrofitting of existing vehicles.

According to the invention, this object is solved in conjunction with the preamble of Patent Claim 1 in that the rail vehicle in the region of its underfloor comprises at least one flexible membrane, which spans hollow spaces or support frame structures of the underfloor of the rail vehicle which are located exposed towards the track systems. On the one hand, this membrane largely screens the hollow space located below against the entering of snow and on the other hand, because of its flexible embodiment, is additionally excited into dynamic oscillations during the driving operation of the rail vehicle through air turbulences in the region of the rail vehicle underfloor and through vibrations from the driving operation of the rail vehicle. Through the flexible embodiment of the membrane, these dynamic oscillations are converted into wave-shaped movement patterns, which take hold of the entire surface of the membrane. The forces caused through these movements act on water drops or ice crystals settling on the membrane and lead to a detaching of the drops or crystals from the membrane surface and to a breaking-open of already compacted crystal structures or bonds of a plurality of ice crystals. Because of this, a permanent agglomeration of water drops or ice crystals on the membrane and thus its icing-up during the operation is effectively avoided. Any possible ice formation during stoppages of the rail vehicle is broken open and thrown off again even after a short time through the movements of the membrane during the operation. Major ice agglomerations are thus effectively avoided through the early throwing-off of relatively small ice and snow accumulations. In addition, this concept according to the invention satisfies all requirements made on a technical concept suitable for the retrofitting of existing rail vehicles. The spanning with a membrane according to the invention on the one hand can be individually adapted to the specific geometrical conditions on the underfloor of the rail vehicle. On the other hand, it satisfies the requirements of light-weight construction and increases the gross weight of a rail vehicle only to a negligible degree.

According to an advantageous configuration of the invention, the membrane is installed transversely to the driving direction of the rail vehicle. Through such an insulation position of the membrane, the aerodynamic forces for eliminating snow and ice agglomerations are optimally utilised, so that the inventive concept can develop its effect even at comparatively low travelling speeds of the rail vehicle.

The concept of the invention furthermore provides that the membrane is fastened in a flexible manner to fixing points which are connected in a fixed manner to the underfloor of the rail vehicle. For providing such defined fastening points, at least one support frame each can be provided on the underfloor of the rail vehicle. The membrane comprises eyes in its edge region through which the anchoring against the support frame by means of threaded pins takes place. The anchoring of the membrane however must not be carried out in such a taut manner that its resilience would be reduced "to zero" by this. A minimum dimension of oscillatability of the membrane must be maintained to ensure the functioning of the inventive concept. Here, the support frame provided for this purpose can be placed onto a deflector element known from the prior art. To support the inventive basic concept the support frame ideally comprises a slope such as promotes a gravity-supported and unhindered sliding-off of the water droplets or ice crystals—for example via a dripping edge of the membrane.

According to a specific embodiment of the invention, the membrane comprises a fabric reinforcement. In this manner, a sagging of the membrane that is too slack is counteracted, which could, in particular at high travelling speeds of the rail vehicle, build up into an uncontrolled flapping of the membrane. The fabric reinforcement additionally increases the operational strength of the membrane against the ambient conditions that prevail during the driving operation of the rail vehicle.

The inventive idea is effectively supported if the surface of the membrane facing away from the underfloor of the rail vehicle and located towards the outside is provided with a hydrophobic coating. Such a coating promotes the trickling down of water drops on the membrane before these freeze on there and can form the basis for major ice agglomerations. Although the coating is effective also during stationary periods of the rail vehicle, it develops its full potential, however, in particular in interaction with the dynamic movements of the membrane during the driving operation of the rail vehicle.

According to a further configuration of the inventive basic concept an intermediate space between membrane and rail vehicle underfloor is filled out with at least one deformable, three-dimensional body. Such a deformable body would also be conceivable in the case of unfavourable geometrical insulation conditions as an alternative to the anchoring of the membrane against fixing points which are connected to the underfloor of the rail vehicle in a fixed manner. In such a case, the membrane would be connected to the envelope of the deformable body for example through glued connections. The deformation of the body can take place passively through the effect of inertial forces during the driving operation of the rail vehicle, but alternatively or additionally thereto also through an active system for the volumetric change of this body (for example through or through actively varying its internal air pressure). According to a first design version, this deformable body can therefore be embodied as closed, inflatable air body. This air body can be divided into a plurality of individual chambers separated from one another, as a result of which the redundancy towards an unintentional pressure loss is increased. According to a second design version, the deformable body can also be embodied as hard foam.

Figure 2:
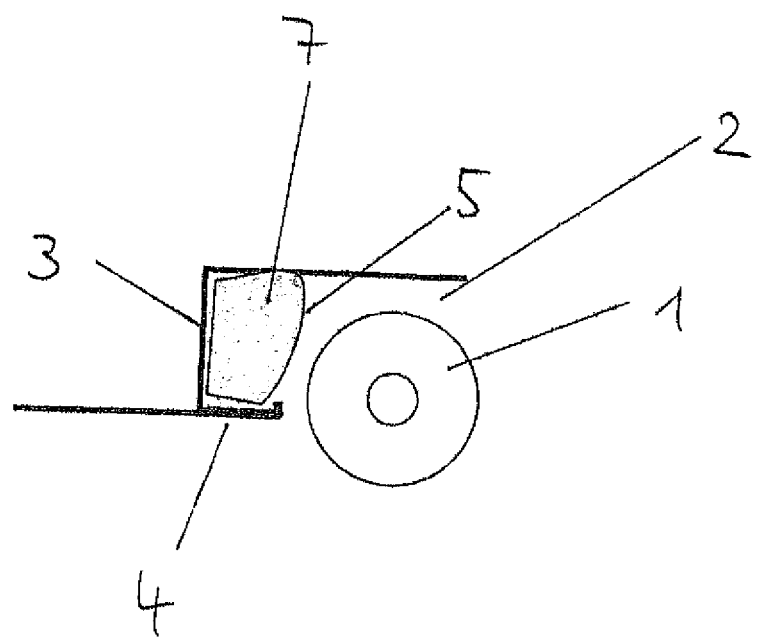
Figure 3:
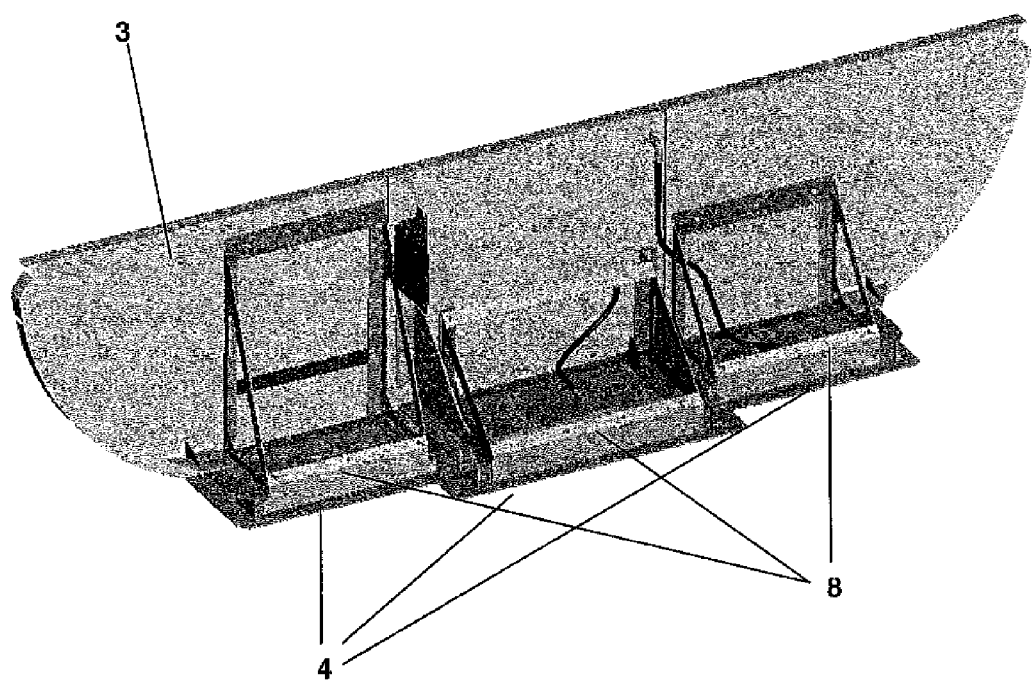

The inventive idea is explained in the following Figures. It shows:

FIG. 1 schematic representation of the bogie free space of a rail vehicle embodied according to the invention with a membrane that is flexibly anchored against fastening points FIG. 2 schematic representation of the bogie free space of a rail vehicle embodied according to the invention with a membrane applied to the outer surface of a deformable three-dimensional body FIG. 3 bulkhead partition of the bogie free space with attached support frame FIG. 1 schematically shows the bogie free space (2) of a rail vehicle embodied according to the invention with a membrane (5) anchored against fixing points (6). Here, the membrane is arranged transversely to the travelling direction of the rail vehicle and, in particular, covers the corner depression formed out of the bulkhead partition (3) and the ceiling of the bogie free space. An oblique arrangement of the membrane in conjunction with a hydrophobic coating of the membrane outside supports a sliding-off or falling-off of snow or ice agglomerating on the membrane. The intermediate space between the membrane and the bulkhead partition or the ceiling of the bogie free space is equipped with a volume-changeable shaped body (7).

FIG. 2 schematically shows the bogie free space (2) of a rail vehicle embodied according to the invention with a membrane (5) applied to the outer surface of a deformable, three-dimensional body (7). In this exemplary embodiment, the oblique arrangement of the membrane is largely omitted. Instead of the oscillating of the flexible membrane induced through air movement, the relative movements of the membrane can be triggered through targeted changes of the air pressure in the filler body.

FIG. 3 shows the bulkhead partition (3) of the bogie free space (2) on which three support frames (8) for receiving a membrane are attached. The support frames are constructed from CRNI design profiles and sit on deflector elements (4), to which they are screwed in a manner promoting a stable position. The support frames furthermore comprise through-bores through which the anchoring of the membrane by means of threaded pins takes place.

LIST OF REFERENCE NUMBERS

1 Bogie of the rail vehicle
2 Free space for bogie of the rail vehicle
3 Bulkhead partition of the bogie free space
4 Deflector element
5 Membrane
6 Fixing point
7 Deformable body
8 Support frame

The invention claimed is:

1. A rail vehicle for driving operation on a track system having a ballasted superstructure, said rail vehicle comprising:
   (a) a bogie;
   (b) an underfloor comprising a ceiling forming a bogie free space above the bogie and a bulkhead partition transverse to a ceiling;
   (c) a hollow space beneath the ceiling and open towards the bogie, said hollow space formed by the bulkhead partition and the ceiling; and
   (d) at least one flexible membrane spanning the hollow space to form a chamber defined by the ceiling and the bulkhead partition.

2. The rail vehicle according to claim 1, wherein the at least one membrane is installed transversely to a driving direction of the rail vehicle.

3. The rail vehicle according to claim 1, wherein the at least one membrane is fastened in a flexible manner to fixing points which are connected to the underfloor of the rail vehicle in a fixed manner.

4. The rail vehicle according to claim 1, wherein the at least one membrane comprises a fabric reinforcement.

5. The rail vehicle according to claim 1, wherein a surface of the at least one membrane facing away from the underfloor of the rail vehicle located towards an outside area is provided with a hydrophobic coating.

6. The rail vehicle according to claim 1, wherein the chamber is filled out with at least one deformable three-dimensional body.

7. The rail vehicle according to claim 6, wherein the at least one deformable, three-dimensional body comprises a closed, inflatable air body.

8. The rail vehicle according to claim 6, wherein the at least one deformable, three-dimensional body comprises hard foam.

* * * * *

UNITED STATES PATENT AND TRADEMARK OFFICE
CERTIFICATE OF CORRECTION

PATENT NO.        : 8,646,391 B2
APPLICATION NO.   : 13/519056
DATED             : February 11, 2014
INVENTOR(S)       : Schmidt et al.

Page 1 of 1

It is certified that error appears in the above-identified patent and that said Letters Patent is hereby corrected as shown below:

In particular, on the title page, column 1, item [73], the spelling of the city of the first listed Assignee should correctly read as follows:

-- Frankfurt am Main --.

Signed and Sealed this
Twenty-second Day of April, 2014

Michelle K. Lee
*Deputy Director of the United States Patent and Trademark Office*